US006915297B2

(12) United States Patent
Chou (10) Patent No.: US 6,915,297 B2
(45) Date of Patent: Jul. 5, 2005

(54) AUTOMATIC KNOWLEDGE MANAGEMENT SYSTEM

(75) Inventor: Peilin Chou, Taipei (TW)

(73) Assignee: Bridgewell, Inc., Taipei (TW)

( * ) Notice: Subject to any disclaimer, the term of this patent is extended or adjusted under 35 U.S.C. 154(b) by 422 days.

(21) Appl. No.: 10/150,993

(22) Filed: May 21, 2002

(65) Prior Publication Data

US 2003/0220908 A1 Nov. 27, 2003

(51) Int. Cl.⁷ .............................................. G06F 17/30
(52) U.S. Cl. ........................................................ 707/5
(58) Field of Search ........................................ 707/2, 6

(56) References Cited

U.S. PATENT DOCUMENTS

| | | | |
|---|---|---|---|
| 5,711,297 A | * | 1/1998 | Iliff ............................ 600/300 |
| 5,806,061 A | * | 9/1998 | Chaudhuri et al. ............. 707/3 |
| 5,974,412 A | * | 10/1999 | Hazlehurst et al. ............. 707/3 |
| 6,035,294 A | * | 3/2000 | Fish ............................... 707/2 |
| 6,122,664 A | * | 9/2000 | Boukobza et al. ........... 709/224 |
| 6,195,651 B1 | * | 2/2001 | Handel et al. .................. 707/2 |
| 6,272,481 B1 | * | 8/2001 | Lawrence et al. ............ 706/45 |
| 6,424,980 B1 | * | 7/2002 | Iizuka et al. ................. 715/513 |
| 6,493,703 B1 | * | 12/2002 | Knight et al. ................... 707/3 |
| 6,629,139 B1 | * | 9/2003 | Kennedy ..................... 709/224 |
| 6,658,598 B1 | * | 12/2003 | Sullivan ....................... 714/25 |
| 2001/0049671 A1 | * | 12/2001 | Joerg ............................ 706/50 |
| 2002/0174222 A1 | * | 11/2002 | Cox ............................ 709/224 |
| 2003/0061200 A1 | * | 3/2003 | Hubert et al. ................... 707/3 |

* cited by examiner

Primary Examiner—Wayne Amsbury
(74) Attorney, Agent, or Firm—Bacon & Thomas, PLLC (57) ABSTRACT

An automatic knowledge management system, includes a knowledge base management module; an automatic search engine to execute the searching instructions of users to search searchable information in a knowledge base; an information filter module to identify information resulting from searching of said automatic search engine, to exclude information that does not satisfy a group of filtering conditions and to store information or its addresses that satisfy said group of filtering conditions into said knowledge base memory; and a searching condition connection module to compare the search conditions as input by one user for one search and/or the corresponding filtering conditions, with the respective groups of search conditions and/or their corresponding filtering conditions previously stored, and to provide to said one user information files and/or addresses of information files resulting from previous searching operations corresponding to such search conditions and/or filtering conditions if the current and prior searches are related.

10 Claims, 6 Drawing Sheets

| Filtering Conditions | English Translation | Value |
|---|---|---|
| IC 設計 | IC design | 0.778 |
| 威盛 | VIA Technologies, Inc. | 0.511 |
| 晶片組 | Chip set | 0.419 |
| 超微 | AMD | 0.343 |
| 晶片 | Chip | 0.332 |
| 南橋 | South bridge | 0.262 |
| 台灣 IC 產業 | Taiwan IC Industry | 0.261 |
| 消費性 IC | Consumer IC | 0.239 |
| 驅動 IC | Driver IC | 0.226 |
| 北橋 | North bridge | 0.214 |
| 智森 | Xilinx | 0.209 |
| 通訊 IC | Communications IC | 0.209 |
| IC design 產業 | IC design industry | 0.205 |
| Intel | Intel | 0.203 |
| IP | IP | 0.201 |
| 網路晶片組 | Network chip set | 0.199 |
| Xilinx | Xilinx | 0.199 |
| 智原 | Faraday Technology Corp. | 0.198 |
| 晶豪 | Elite Semicon Memory Technology | 0.174 |
| 矽成 | Integrated Circuit Solution Corp. | 0.169 |
| 邏輯 IC | Logic IC | 0.159 |
| 矽統 | Silicon Integrated Systems Corp. | 0.128 |
| 控制晶片 | Controller IC | 0.125 |

Fig. 6

AUTOMATIC KNOWLEDGE MANAGEMENT SYSTEM

FIELD OF INVENTION

The present invention relates to an automatic knowledge management system, especially to an automatic knowledge management system wherein a knowledge base is established by automatic collection of information in the internet, intranet, and extranet according to the requirements of particular users and the knowledge base may be shared by a plurality of users.

BACKGROUND OF INVENTION

Storing information in a knowledge base according to its classification system to be used by users, has been a known way of knowledge management. Under the conventional approach, the information as stored in the knowledge base is input by operators. Due to the wide application of the internet, intranet and extranet in the recent years, a large quantity of useful information has been stored and provided in the information storage devices of all sections in the internet, intranet, and extranet. The content of the information is updated day by day. Searching in the internet, intranet, and extranet for useful information has become a popular approach in the maintenance of the knowledge base of all users. As a result, all kinds of search engine are developed and supplied in the market. Some search engines are even able to automatically search useful information in the internet, intranet, and extranet constantly, and store the information in the knowledge base.

Although the search engines provide convenience to users, the purpose of such search engines is to search as much information as possible. A large quantity of useless information is generated as a result of the search of the search engines. Automatic searching of information always results in the overloading of the computer system of the users. In addition, the information as searched by the search engines may become valuable knowledge, after it is selected and organized. However, in the external or internal computer system of a corporate or an organization, the knowledge so generated by a member may not be shared by other members. As a result, individual users have to spend their efforts to respectively search, select and organize information, even for the same topic. No knowledge management system has ever provided the sharing function to save efforts and costs in searching information relating to the same topic.

It is thus necessary to provide an automatic knowledge management system to automatically search and select useful information in a wide field knowledge base and to store the information in the knowledge base.

It s also necessary to provide an automatic knowledge management system wherein knowledge generated by searching information in a wide field knowledge base by one user and the generation of the knowledge may be shared by other users.

It is also necessary to provide an automatic knowledge management system whereby the user will be alerted when a particular knowledge is obtained.

It is also necessary to provide an automatic knowledge management system, wherein, during the knowledge generation process, the user may be disclosed of prior experiences of generation of knowledge belonging to related fields or topics, such that knowledge generation may be accelerated.

OBJECTIVES OF INVENTION

The objective of this invention is to provide an automatic knowledge management system to automatically search and select useful information in a wide field knowledge base and to store the information in the knowledge base.

Another objective of this invention is to provide an automatic knowledge management system wherein knowledge generated by searching information in a wide field knowledge base by one user and the generation of the knowledge may be shared by other users.

Another objective of this invention is to provide an automatic knowledge management system whereby the user will be alerted when a particular knowledge is obtained.

Another objective of this invention is to provide an automatic knowledge management system, wherein, during the knowledge generation process, the user may be disclosed of prior experiences of generation of knowledge belonging to related fields or topics, such that knowledge generation may be accelerated.

A further objective of this invention is to provide a method of operation of the aforesaid automatic knowledge management system.

SUMMARY OF INVENTION

According to the present invention, the automatic knowledge management system of this invention comprises: a knowledge base management module to accessibly store knowledge information in particular file formats or related file addresses into an adjustable knowledge tree structure in its knowledge base memory means; an automatic search engine to execute the searching instructions of users periodically or non-periodically to search searchable information in a wide filed knowledge base according to certain search conditions and to store results of such search into its information buffer memory means; an information filter module to identify information resulted from the searching of the automatic search engine, to exclude information that does not satisfy a group of filtering conditions and to store information or its addresses that satisfy said group of filtering conditions into said knowledge base memory means; and a searching condition connection module to compare the search conditions as input by one user for one search and/or the corresponding filtering conditions, with the respective groups of search conditions and/or the corresponding filtering conditions of prior searches, and to provide to said one user information files and/or addresses of information resulted from or names of users who conducted searches corresponding to such search conditions and/or filtering conditions, when result of such comparison is "relative". The information filter module of this invention comprises a filtering condition generation means that automatically generates and/or modifies a group of information filtering conditions, according to codes or values that were given by said one user in relating to a particular plurality of information files and according to at least a part of the content of said information files. This invention also provides an automatic operation method for the automatic knowledge management system.

The above and other objectives and advantages of this invention may be clearly understood from the detailed description by referring to the following drawings.

BRIEF DESCRIPTION OF DRAWINGS

In the figures.

DETAILED DESCRIPTION OF INVENTION

Figure 1:
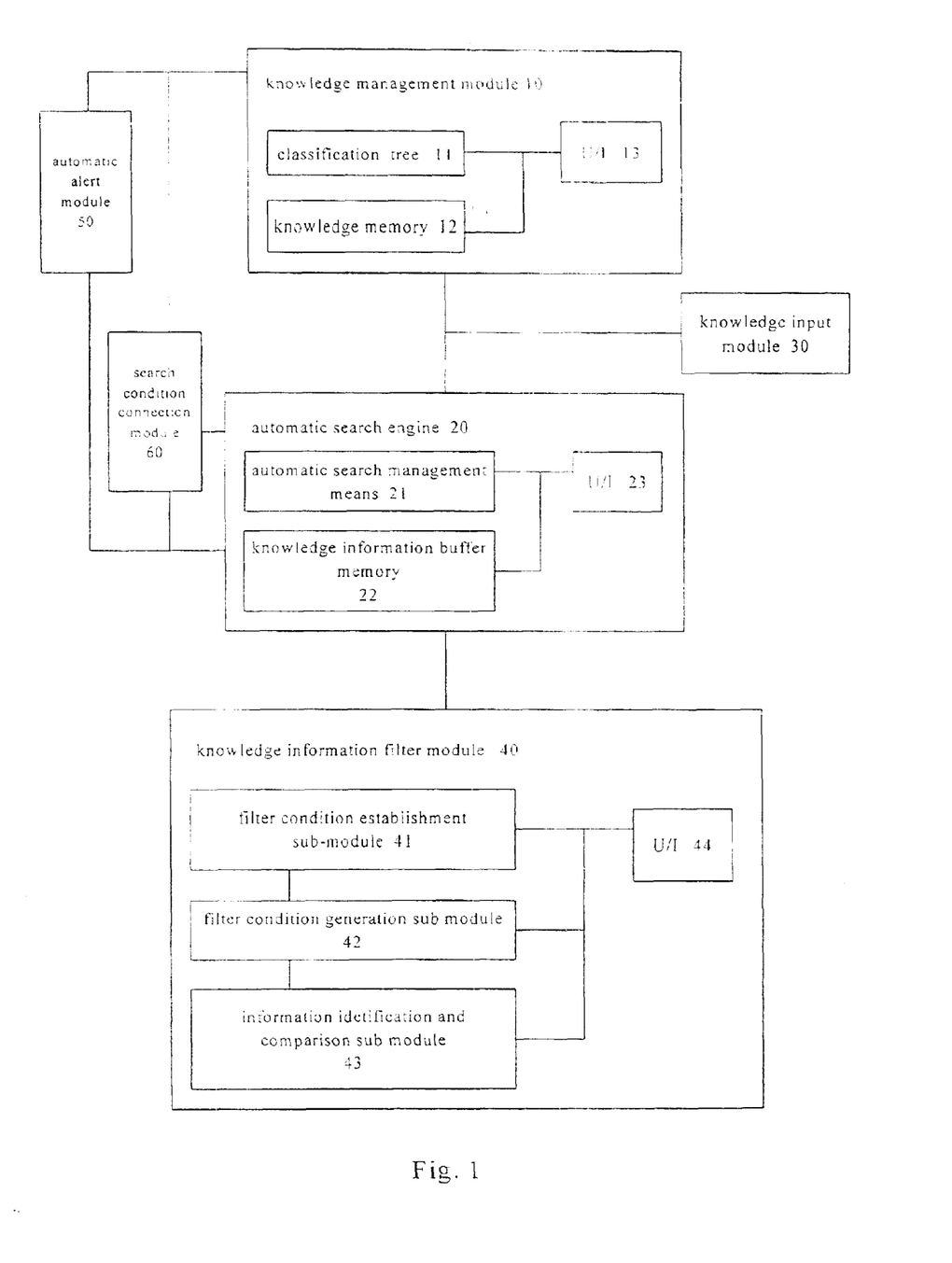
FIG. 1 illustrates the system diagram of the automatic knowledge management system of this invention.

A detailed description of the embodiment of the automatic knowledge management system of this invention will be given below. FIG. 1 illustrates the system diagram of the automatic knowledge management system of this invention. As shown in this figure, the automatic knowledge management system of this invention comprise: a knowledge base management module 10 to accessibly store knowledge information in particular file formats or related file addresses into an adjustable knowledge tree structure 11 in its knowledge base memory means 12; an automatic search engine 20 to execute the searching instructions of users periodically or non-periodically to search searchable information in a wide filed knowledge base according to certain search conditions and to store results of such search into its information buffer memory means 22; an information filter module 40 to identify information resulted from the searching of the automatic search engine, to exclude information that does not satisfy a group of filtering conditions and to store information or its addresses that satisfy said group of filtering conditions into said knowledge base memory means 12; and a searching condition connection module 60 to compare the search conditions as input by one user for one search and/or the corresponding filtering conditions, with the respective groups of search conditions and/or the corresponding filtering conditions of prior searches, and to provide to said one user information files and/or addresses of information resulted from such prior searches or names of users who conducted searches corresponding to such search conditions and/or filtering conditions, when result of such comparison is "relative". The information filter module 40 of this invention comprises a filtering condition generation means 42 that automatically generates and/or modifies a group of information filtering conditions, according to codes or values that were given by said one user in relating to a particular plurality of information files and according to at least a part of the content of said information files.

Detailed description of the modules of the automatic knowledge management system of this invention will be given as follows:

Knowledge Base Management Module

The knowledge base management module 10 of this invention is to store knowledge information files or their filing addresses in a classification system, after the knowledge information files are organized for particular purposes, such that the information is easily accessed by users. Knowledge base management modules applicable in this invention include all kinds of commercially available knowledge base application software, as long as the software is able to give connections between the information files as stored with a classification system of a knowledge base structure, according to the features of the content of the information files. Under this design, a user is able to search in the knowledge base, using particular searching conditions, knowledge information files with features identical or similar to said searching conditions. In general, a classification tree structure helps to achieve such a purpose. In addition, a database system may also provide such function. In the embodiment of this invention, all the knowledge information files are organized under a classification tree structure 11, so that a practicable and stable file classification structure may be obtained.

In one embodiment of this invention, the classification tree structure 11 may be generated by individual users according to their respective needs. In another embodiment of this invention, the classification tree structure 11 may be automatically generated by the system and adjusted by the user who created the structure. As a result, the classification tree structure may be created individually and may be revised by adding, deleting and adjusting classes into such classification tree structure 11.

Figure 2:
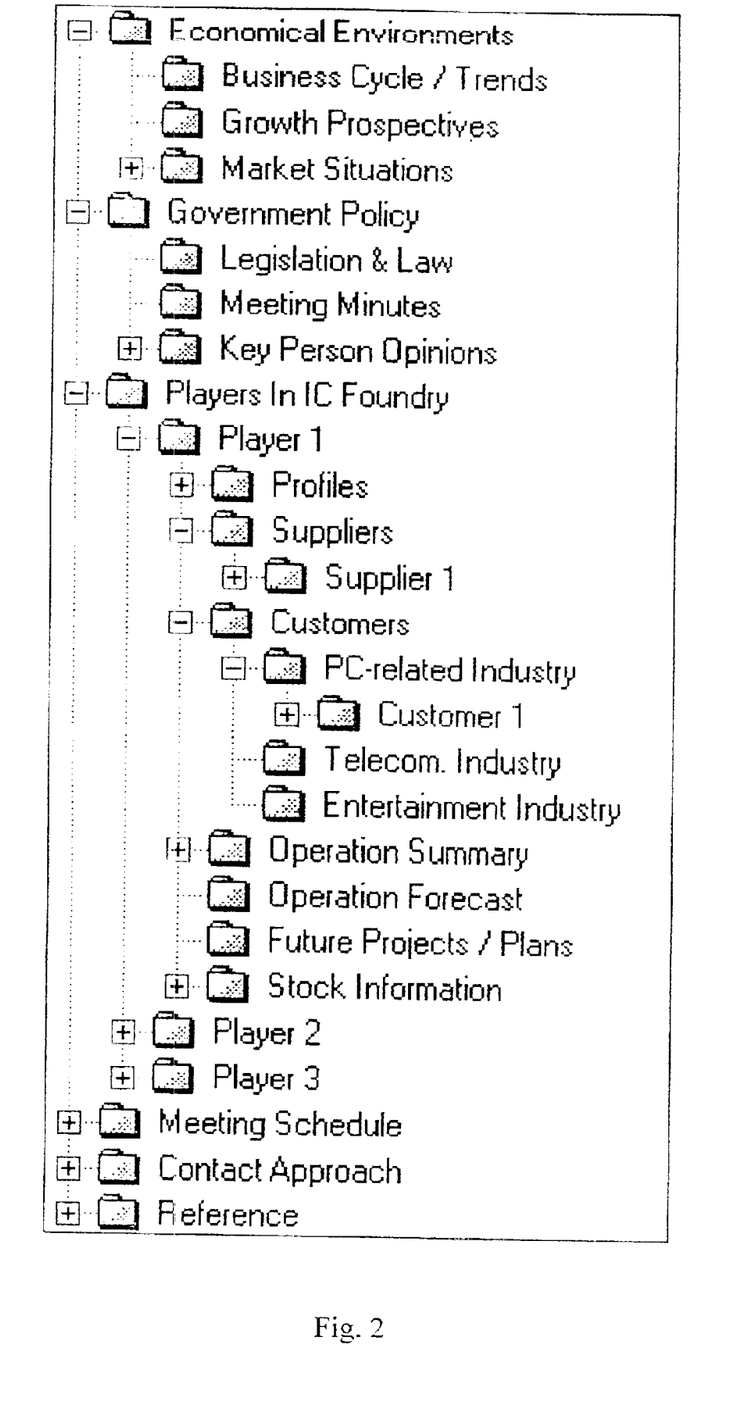
FIG. 2 shows an example of the user interface of the knowledge tree structure of the automatic knowledge management system of this invention.

FIG. 2 shows the user interface of the knowledge classification tree structure applicable in the automatic knowledge management system of this invention. Using a software program and a user interface as shown in FIG. 2, user are allowed to use a mouse to click on any class in the classification tree structure to delete the class, to add a new subclass to that class, or to copy a class to be a subclass of another. The knowledge information classification tree structure 11 connects a class to one or more knowledge information files or their file addresses. When a class is deleted or moved, the connections between it and its corresponding information files/file addresses are changed automatically, or are stared in a buffer memory section (not shown) for processing.

The results of the above operation will be stored in the knowledge base memory means 12.

In the knowledge base management module 10, the knowledge base management application program and the application program of the classification tree structure 11 may be easily accomplished by those skilled in the art. Detailed description thereto is thus omitted.

Automatic Search Engine

The automatic search engine 20 is to execute the searching instructions of users, to search searchable information in a wide filed knowledge base according to certain search conditions. The automatic search engine applicable in this invention may be any commercially available searching engine software or hardware. The search engine 20 shall have the function to search in a wide field knowledge base according to the search conditions given by users, for information files that satisfy the search conditions. Here, the term wide field knowledge base shall include any knowledge base that is accessible to particular users. Examples of the wide field knowledge base include the internet, an intranet, an extranet and the databases belonging to information service providers that are accessible to the users of the automatic knowledge management system of this invention.

In general, a simple search engine may be a searching program that is able to search information files with "key words". In addition, using an article classification and feature extraction tool to search for the information files may also be applied in this invention. The automatic article feature extraction tool as disclosed in U.S. patent application Ser. No. 90/525,692 "Method for Associating Attributes to Documents" (Taiwan patent No. 466425) is one example of the feature exaction and classification means applicable in this invention. In using such a tool, a user interface (not shown) is established in the computer device (not shown) of the user site and the search engine is installed in a search engine website (not shown). Users are allowed to input search instructions and search conditions from the user interface. The computer device of the user site is connected to the search engine website, giving the search engine such search instructions and search conditions and the search engine will operate to conduct the search as instructed. The search engine website may be an intelligent searching website, a feature-extraction and classification searching website and/or a classification knowledge base website. After knowledge information files that satisfy the search conditions are obtained, the search engine will transmit the information files or their access information to the computer device of the use site, showing the result of such search on the screen, for further use. The computer device of the user site may be a personal computer, a server, a PDA, a webphone, or any device that may be connected to a search engine website.

The structures and functions of the search engine are already known to those skilled in the art. Detailed description of the search engine is thus omitted.

In this invention, the automatic search engine 20 does not only provide the function of searching information files in a wide field knowledge base, but also the function to automatically execute the searching instructions of users, periodically or non-periodically. In order to provide such a function, an automatic search management means 21 is provided in the automatic search engine 20 of this invention.

Figure 3:
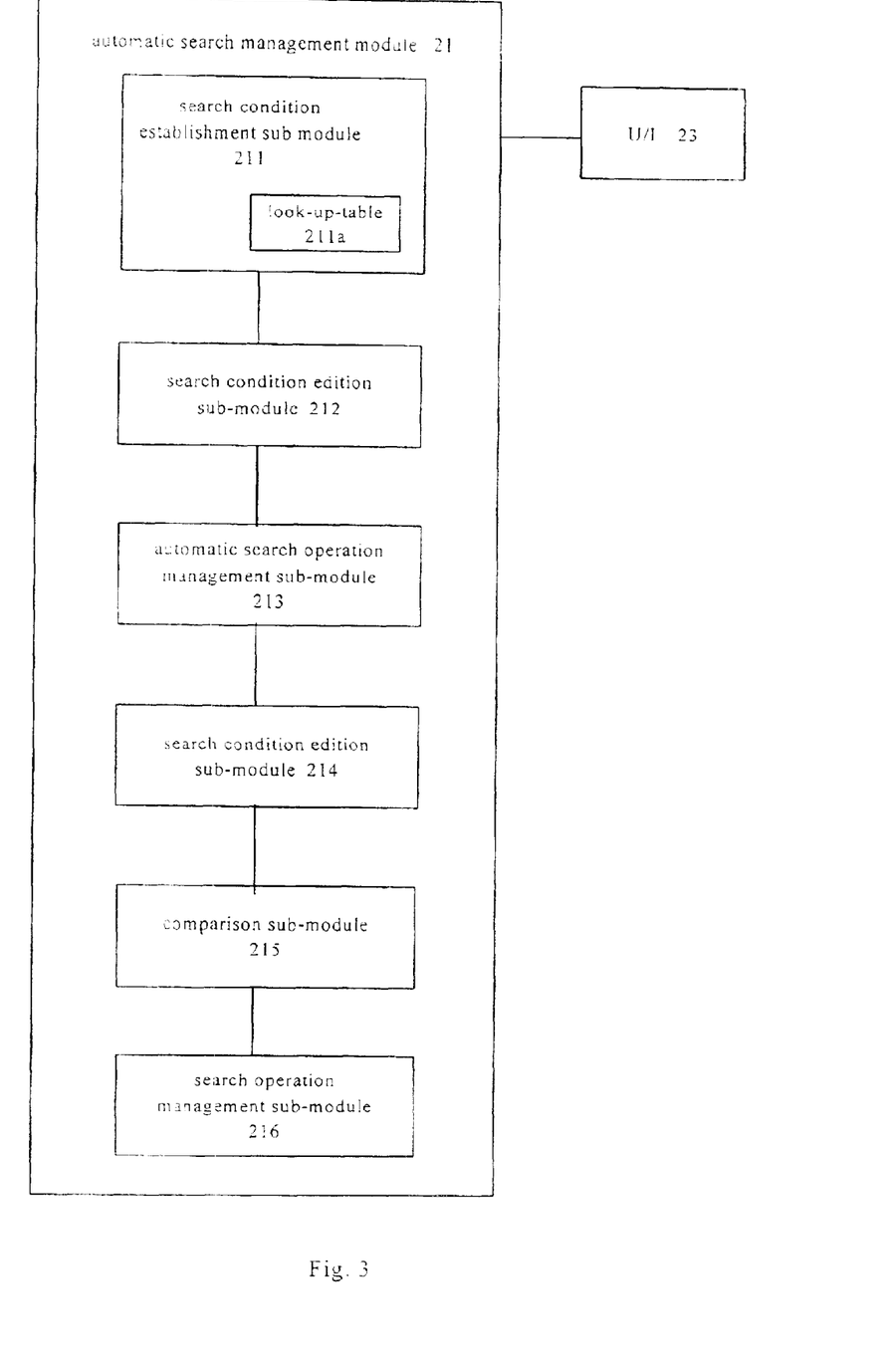
FIG. 3 illustrates the block diagram of the automatic searching management means of the automatic knowledge management system of this invention.

FIG. 3 illustrates the block diagram of the automatic search management means 21 of the automatic search engine 20 of this invention. As shown in this figure, the automatic search management means 21 comprises:

A search condition establishing submodule 211 to establish the connections between one "search topic" and a group of "search conditions". In such a submodule, a look-up-table 211a is provided to record the connections between a plurality of "search topics" and their corresponding "search conditions". Each individual search topic may correspond to a plurality of search conditions. The look-up-table may further include the connections between the search topics and their only corresponding classes under the classification tree structure 11.

A search condition edition submodule 212 to allow users to add, delete and/or change the content of the search conditions and their connections, as are described in the look-up-table 211a, through a user interface.

An automatic search operation management submodule 213 to establish the connections between one "search topic" and one "search operation condition". The term "search operation condition" includes any condition that triggers the automatic search engine to execute the search instruction for knowledge information, such as time, time interval, an inference, an alert, an instruction from a user, an instruction from the system administrator etc. The condition may be established to one or more or all search topics.

A search operation condition edition submodule 214 to allow users to add, delete and/or change the content of the search operation conditions and their connections, through a user interface 23.

A comparison submodule 215 to store the results of the last automatic search, the automatic search of a certain date and time or a plurality of automatic searches conducted by individual users in a memory, to compare the result of a certain automatic search with the stored search results, and to update the data representing the results of the automatic searches according to the result of such comparison.

A search operation management submodule 216 to generate a search instruction when any of the search operation conditions is satisfied, so that the automatic search engine 20 executes a search operation according to the corresponding search conditions; to output data representing result of the automatic search to said comparison submodule 215, after having received the search result of the automatic search engine; to store results of the operation of said comparison submodule into the information buffer memory 22; and to record its operation after having stored the results of the operation of said comparison submodule.

Knowledge Input Module

In the automatic knowledge management system of this invention, the knowledge as stored in the knowledge base may include knowledge obtained from methods other than searching in the wide field knowledge base. As a result, besides the automatic search engine 20, a knowledge input module 30 is also provided, so that user may input knowledge on line, or download knowledge information that is already edited systematically. The knowledge information as input online or downloaded is stored under a class in the classification tree structure 11.

Information Filter Module

The knowledge information as obtained in the preceding operations is only information related to the corresponding search topics; Such information may not be called "knowledge". In the conventional technology, such information shall be reviewed file by file by the users to determine whether the content of individual information files inherits useful knowledge and to select useful information according to said determination. If an automatic knowledge management system is not provided with an information filter module, the result of the automatic search will appear to be a large quantity of information or junk information, which in turn will spoil the memory device of the computer device. As a result, automatic search of knowledge information will not be practicable.

Figure 4:
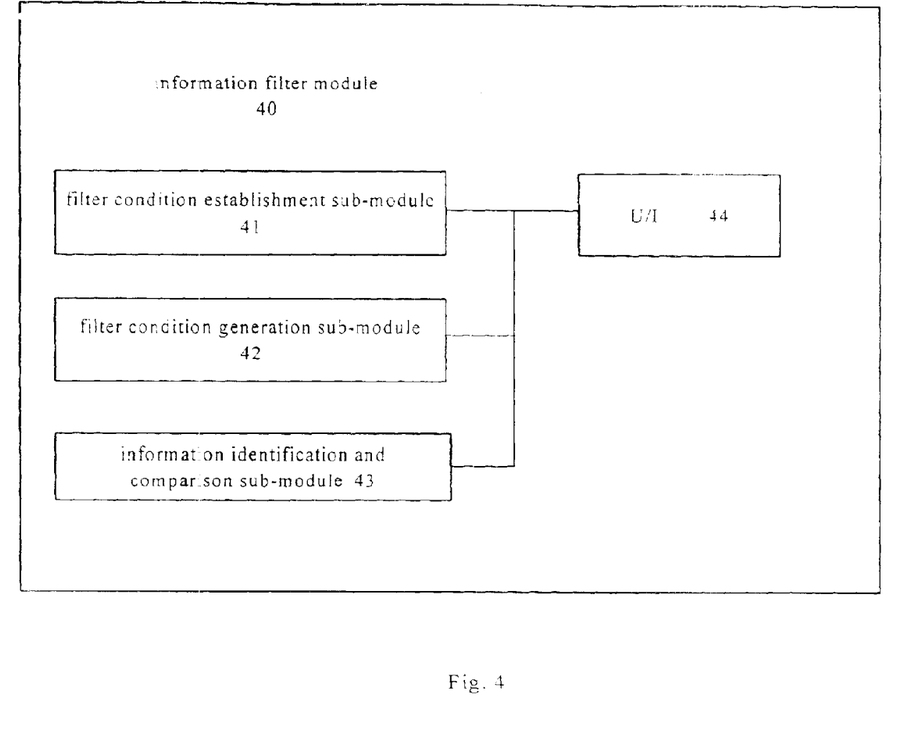
FIG. 4 illustrates the block diagram of the information filter module of the automatic knowledge management system of this invention.

In order to solve this problem, an information filter module 40 is provided. The information filter module 40 identifies information resulted from the automatic searches of the automatic search engine 20 and filters out "useless" or "undesired" information from the search results. FIG. 4 illustrates the block diagram of the information filter module 40 of the automatic knowledge management system of this invention. As shown in this figure, the information filter module 40 comprises a filter condition establishment submodule 41, a filter condition generation submodule and an information identification 42 and comparison submodule 43.

In this module, the filter condition establishment submodule 41 provides a user interface 44, allowing users to establish information filter conditions. In the practical application, a semantic analyzer may be provided in this submodule to convert the semantic description of an information filter condition into a group of initial information filtering conditions according to certain rules. Such initial information filtering conditions may be used to determine whether the content of an information file is desired or not.

In the embodiment of this invention, the information filter condition establishment submodule 41 is provided with a learning capability. In the practical application, a user interface 44 is provided to display interactively contents of selected information files as obtained in the aforesaid automatic searches to be reviewed by a user. After the user has reviewed the whole or a part of the content of the information file (or "article"), the user is required to input "yes"

("relevant") to indicate acceptance of the reviewed part of the content "no" (or "relevant") to indicate non-acceptance, or "value" (value of relativity) in the user interface 44 to indicate the relation of the content of the articles and the corresponding search topics. The filter condition establishment submodule then transmits the value given by the user and the content of the reviewed articles to the information filter condition generation submodule 42 to automatically generate a group of information filter conditions.

The information filter condition generation submodule 42 of this invention automatically generates a group of inference rules as information filter conditions in corresponding to the initial filtering conditions as given by the user. The information filter conditions are generated according to the initial filter conditions as given by the user, the value of relativity of the content of the plurality of information files and the search conditions or search topic, and the features of the content of the plurality of information files.

The information filter condition generation submodule provides the following functions:

Semantic analysis function: to convert the semantic description of the filtering conditions as given by the user into a group of initial filter conditions.

Feature extraction function: to extract fragments of the content of particular information files and/or the position relations between fragments of the content of the information files, in corresponding to said group of initial information filter conditions.

Relativity analysis function: to generate a group of inference rules as information filter conditions according to the values of relativity as given by the user to the plurality of selected information files, i.e., the values to represent the relativity between the whole content of an information file and the search condition or the search topic.

Figure 5:
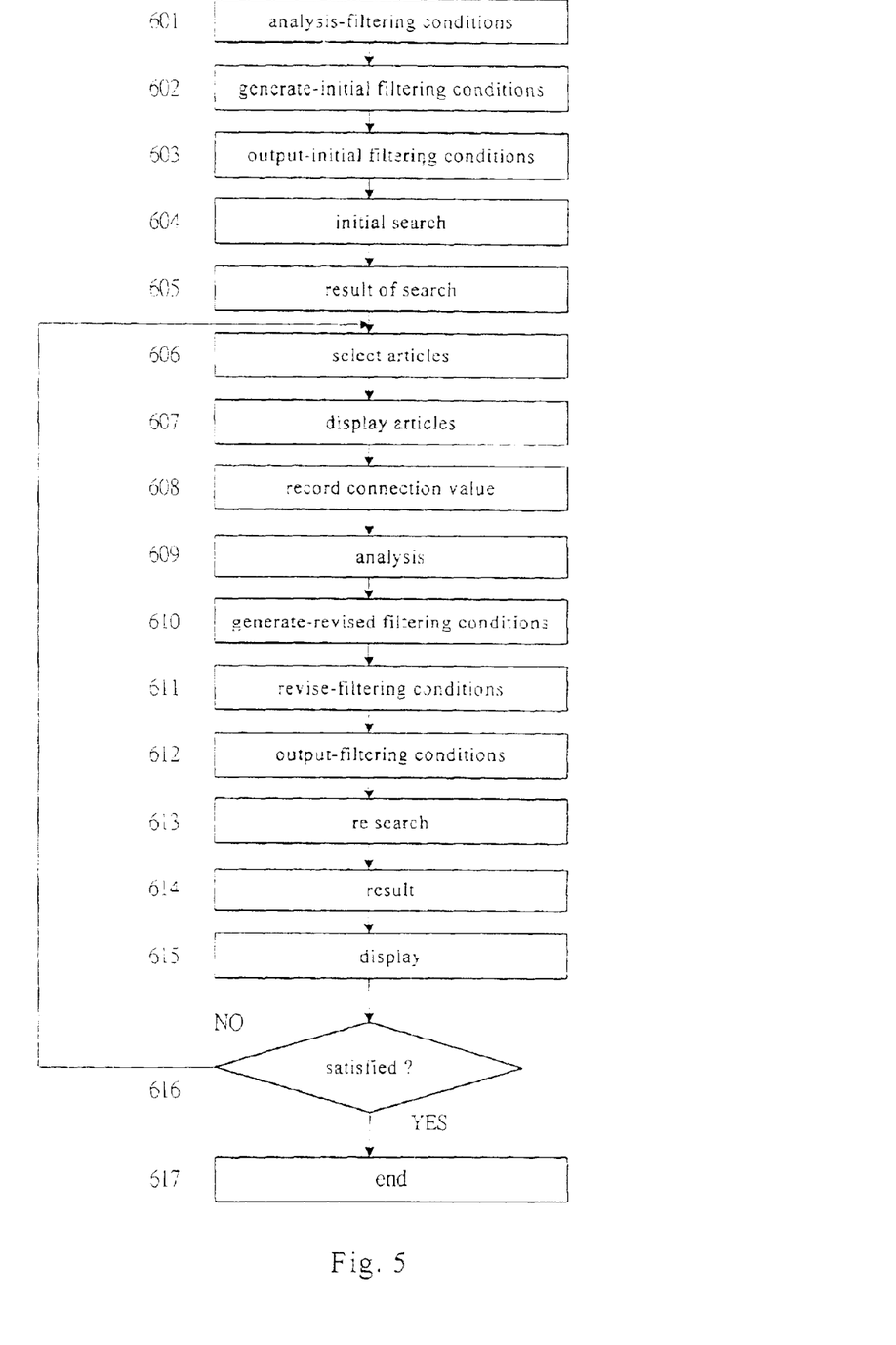
FIG. 5 shows the flow chart of the operation of the information filter condition generation submodule of the information filtering module of the automatic knowledge management system of this invention.

Learning function: to analyze the content of a group of selected information files with contents that are determined to be highly relative to the search conditions or the search topic, other than those having been analyzed in the preceding analysis process or processes and to adjust the inference rules as generated in the preceding analysis process or learning process or processes for the same group of search conditions or the same search topic, according to values of relativity as given by the user thereto. In the present invention, the operation of the information filter condition generation submodule may be as follows, as shown in FIG. 5. FIG. 5 shows the flow chart of the operation of the information filter condition generation submodule 42 of the information filtering module 40 of the automatic knowledge management system of this invention.

As shown in FIG. 5, at 601, the user inputs the semantic description of an information filter condition:

"Sales tax problems after the closing of a merger project".

At 602, the information filter condition generation submodule 42 generates a group of initial information filter conditions by picking up filtering conditions corresponding to fragments of the above semantic description in a generally purposed look up table established according to analysis of a large quantity of information files, as follows:

Merger→M&A, merge, acquisition, merge and acquisition etc.

Sales tax→sales tax, value added tax etc.

Based on this, at 603 the information filter condition generation submodule 42 transmits inference rules including "or" between each of the terms to the automatic searching engine 20, whereby at 604 the automatic search engine connects itself to a wide field information database and searches information files that satisfy the inference rules. Here, these inference rules may be called "initial" filter conditions.

After such a search, at 605 a quantity of information files or articles will be obtained. These information files or articles are labeled "relative" and at 606 a number of articles, such as 20–40 articles, or any number of articles depending on the acceptable workload of the user, are selected randomly. At 607, the selected articles are shown on the user interface, such that the user may review them and give them an evaluation value separately. In practical cases, the user is required to give each article a value of "relative" or "irrelative", which represents the user's subjective determination on whether an article is relative to the filtering conditions or the search topic.

In the above example, the process allows the user to "train" the information filter condition generation submodule 42 by starting searching information files with the initial filter conditions. In another example, the initial search may be conducted by the automatic search engine 20 with the initial search conditions to provide similar functions.

After the user has given all articles respective evaluation values, at 608 the values are recorded. At 609, the information filter condition generation submodule analyzes the selected articles and records terms that have relatively higher frequency of existence in each article and/or the relative position relations between certain selected terms.

At 610, a group of information filter condition is generated according to the frequency values of the selected terms and/or the position relations of the selected terms. In a preferred embodiment of this invention, a number of terms with highest frequency values in an article as labeled "irrelative" by the user are converted into an inference rule of "~ term" and a number of terms with highest frequency values in one article as labeled with "relative" by the user are converted into an inference rule of "+ term". At 611, the inference rules so generated are used to modify or replace the initial information filter conditions or the group of information filter conditions previously generated.

At 612, the modified information filter conditions are transmitted to the automatic search engine 20 again. At 613 the search engine searches in the wide field knowledge base or in the group of information files as first obtained from the previous search, for information files or articles that satisfy the modified filter conditions. At 614 the search comes out with far less number of information files or articles and, at 615, a number of randomly selected articles are displayed on the user interface, allowing the user to input his/her determination of whether the result is satisfactory to him/her. If at 616, the determination of the user is input as "yes", the operation of the information filter conditions is ended at 617, whereby the information filter conditions are stored in the knowledge base memory means 12 for further use; otherwise, the operation goes back to 607 whereby the user is required to input his/her evaluation values. The operation continues until the user is satisfied with the information filter conditions as generated and modified.

After such repeated modification, a group of "mature" information filter conditions will be generated.

In the above example, the information filter conditions are inference rules. Other formats of information filter conditions or other methods of description of the information filter conditions are also applicable in this invention.

In the present invention, the function of the information identification and comparison submodule 43 is to analyze and identify the information files or articles as obtained by the search of the automatic search engine 20 and to delete information files or articles that are determined as "irrelevant" according to the information filter conditions as generated by the information filter condition generation submodule 42. After such an identification and comparison operations, the residual information files or articles are stored in the knowledge memory means 12. After the processing of the information filtering module, the information files or articles as stored in the knowledge memory means 12 are those most relative to the search topics. This invention provides an effective approach to filter out a large quantity of irrelevant or useless information files, resulted from the automatic searches, without the need of human judgments or participation.

Automatic Alert Module

In some embodiments of this invention, an automatic alert module 50 is provided. When an information file or article that satisfies certain alert conditions is obtained as a result of the automatic search, the user will be alerted of such incident to remind the user to read or to download the information file. Such an alert module 50 may be any commercially available computer software. It is also possible to use an alert module with similar or same structure as the information filter module 40 of this invention, with some minor modifications. Such an automatic alert module 50 may be easily accomplished by those skilled in the art. Detailed description thereof is thus omitted.

Search Condition Connection Module

In the present invention, a search condition connection module 60 is provided. The search condition connection module 60 provides the function of sharing experiences among users. The purpose of the search condition connection module 60 is to allow a user who is interested in one search topic to share the experiences of another who has conducted a search on the same or a similar topic. Under the design of this invention, when a user uses the automatic knowledge management system of this invention to automatically search knowledge information of one topic, the searching activities are recorded. When another user uses the automatic knowledge management system to conduct a search on the same or a similar topic, the search results, the search activities, including the search topic, search conditions and/or the filtering conditions, and/or the name of information sources and the previous searcher will be provided to the latter user, such that they may share their experiences by referring to the search destinations, results or search activities of the other, or by interactive experience sharing.

In order to accomplish this objective, the search condition connection module 60 of this invention compares the search conditions as input by one user for one search and/or the corresponding information filter conditions, with the respective groups of search conditions and/or the corresponding information filter conditions of prior searches, and to provide to said one user information files and/or addresses of information files resulting from such prior searches or names of users who conducted searches corresponding to such search conditions and/or filtering conditions, when a result of such comparison shows that the prior searches are related. In the determination of whether two searches are related, a group of rules may be used to calculate the relativity values of the searches. The rules may be similarity values between groups of search conditions and/or information filter conditions. When the relativity value of two searches exceeds a threshold, the two searches are determined to be related.

In one embodiment, the search condition connection module 60 provides the information files, the addresses of the information files and/or the web addresses of the information files, all resulting from the previous searches, to the latter user.

In another embodiment, the search condition connection module 60 provides names or mailing addresses of the previous searches with related search topics to the latter user.

In one other embodiment, the search condition connection module 60 provides the content of the information files resulting from the related previous searches, to the latter user, if such information files are stored in the knowledge base memory means 12.

With this design, the latter searchers may use the knowledge information resulted from previous searches directly, or discuss with the previous searchers online, or utilize the knowledge information as obtained and processed by the previous searchers.

Embodiment

Figure 6:
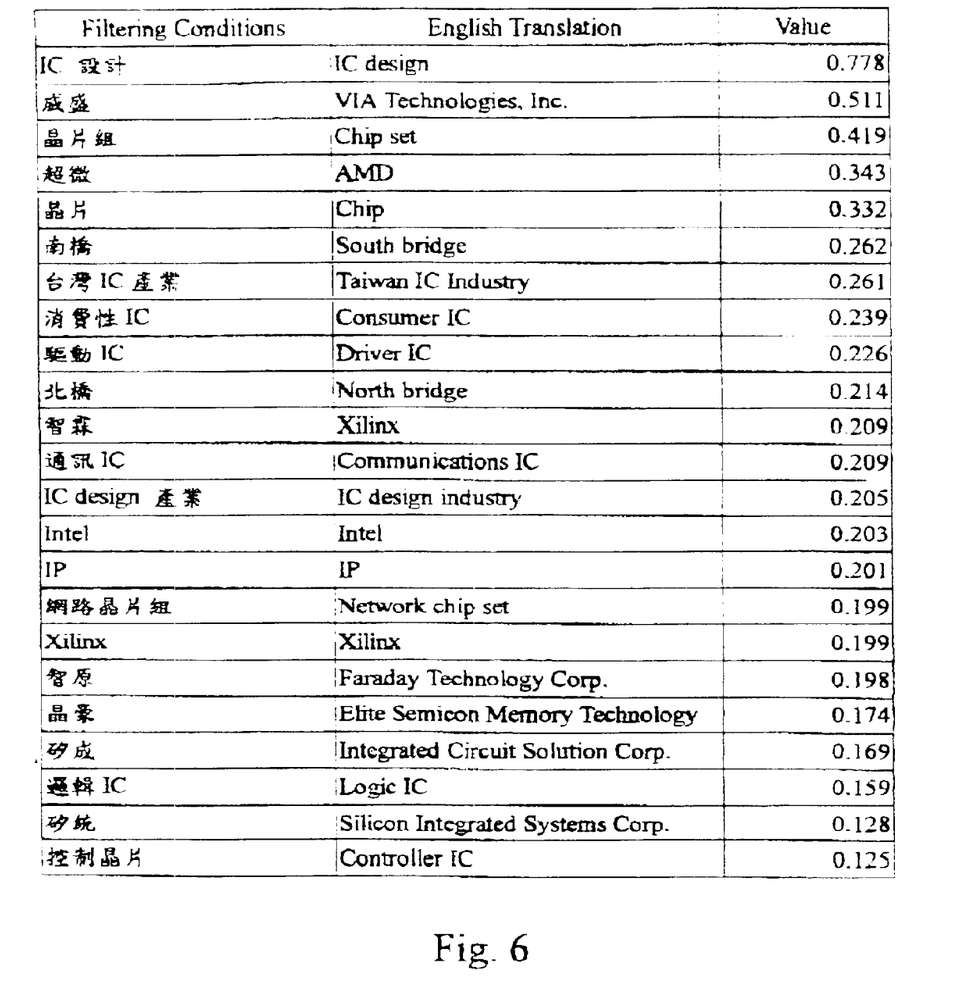
FIG. 6 illustrates the first 23 filtering conditions and their relation values to the search topic in an embodiment of the automatic knowledge management system of this invention.

In the automatic knowledge management system of this invention, an automatic search in the internet, intranet, and extranet using a personal computer connected to the wide field knowledge base is conducted. The processes and the results are recorded, as follows:

1. Targets of search: www.iii.org., www.itri.org.tw, www.via.com.tw, www.sis.com.tw, www.ali.com.tw.
2. Topic of search: The IC design industry of Taiwan
3. Search conditions: "Taiwan IC industry", "IC design industry", "VIA", "SIS", "ALI", "Mediatek", "Chipset", "Control chip".
4. Result of initial search: After a search in the aforesaid websites, 178 articles are obtained, including: "Taiwan IC industry"—55 articles, "chipset"—45 articles, "VIA"—60 articles, "ALI"—25 articles, "SIS"—18 articles and "control chip"—30 articles.
5. Information filter conditions: A matrix of filtering conditions is generated to include a plurality of terms and their respective relation values to the search topic "the IC design industry of Taiwan". FIG. 6 illustrates the first 23 terms and their relation values to the search topic. Note that the search is conducted to knowledge bases containing articles in Chinese text and that the search conditions and the filtering conditions contain mostly Chinese characters.
6. Filtering process: Terms listed in the filtering condition matrix existing in an article are allocated and the sum of their numbers of existence times their respective relation values is calculated, as the relation value of the article. If the sum is greater than a threshold value, the article is de satisfactory to the information filter conditions. The threshold value may be decided by the user according to the need.
7. Result of filtering process: After the filtering process, 7 articles among the searched articles are determined satisfactory.

Effects of Invention

As described above, the information filter module of this invention is able to filter out information files that are not relative to the search topic. As a result, the problem of junk documents resulted from the conventional automatic search technology may be solved.

According to this invention, the results of the automatic searches are stored in the knowledge base memory means according to their classification. The searches may thus be conducted automatically. The user needs not to maintain his/her knowledge base from time to time. The user needs only to read or otherwise utilize the knowledge information files when necessary. Such a design does not only reduces the costs and labors of the users and the system administrator, but also enables the application of automatic search of knowledge information, especially scheduled search of knowledge information.

The information filter module of this invention provides a learning ability. Users are allowed to easily train the information filter module into a mature and personal information filter.

In the present invention, the automatic alert module reminds the user of any particularly useful or needed information. As a result, users don't need to conduct a search of topics of interests from time to time.

Nevertheless, the search condition connection module enables the sharing of experience among users. Users are allowed to share the experiences of others, without the need of any training activity.

As the present invention has been shown and described with reference to preferred embodiments thereof, those skilled in the art will recognize that the above and other changes may be made therein without departing from the spirit and scope of the invention.

What is claimed is:

1. An automatic knowledge management system, comprising:
   a knowledge base management module to accessibly store knowledge information in particular file formats or related file addresses into a knowledge base memory means;
   an automatic search engine to execute the searching instructions of users to search searchable information in a knowledge base according to certain conditions;
   an information filter module to identify information resulting from searching of said automatic search engine, to exclude information that does not satisfy a group of filtering conditions established by the user, based on user acceptance of at least part of the content for the information file, and to store information or its addresses that satisfy said group of filtering conditions into said knowledge base memory means; and
   a searching condition connection module to compare the search conditions as input by one user for one search and/or the corresponding filtering conditions, with the respective groups of search conditions and/or their corresponding filtering conditions previously stored, and to provide to said one user information files and/or addresses of information files resulting from previous searching operations corresponding to such search conditions and/or filtering conditions, when a result of such comparison shows that the search conditions as input by one user for one search and/or the corresponding filtering conditions are related to the respective groups of search conditions and/or their corresponding filtering conditions previously stored.

2. The automatic knowledge management system according to claim 1, wherein said knowledge base memory means of said knowledge base management module comprises an adjustable classification tree structure.

3. The automatic knowledge management system according to claim 1, wherein said automatic search engine searches knowledge information according to a predetermined schedule.

4. The automatic knowledge management system according to claim 1, wherein said information filter module comprises a filtering condition generation means that automatically generates and/or modifies a group of information filtering conditions, according to codes or values that were given by said one user in relating to a particular plurality of information files and according to at least a part for the content of said files.

5. The automatic knowledge management system according to claim 4, wherein said part of the content of said information files comprises terms that exist in said information files with relative high frequencies.

6. The automatic knowledge management system according to claim 4, wherein said information filtering conditions comprise terms that may exist in an information file and their respective relation values to said search conditions.

7. The automatic knowledge management system according to claim 5, wherein said information filtering conditions comprises terms that may exist in an information file and their respective relation values to said search conditions and said information identification process of said information filter module includes calculation of a sum of frequencies in an information file for respective terms of the filtering conditions, times their respective relation values.

8. The automatic knowledge management system according to claim 1, wherein said information filter conditions comprises inference rules.

9. The automatic knowledge management system according to claim 1, further comprising a semantic analyzer to convert said search conditions and/or said information filter conditions into machine-executable instructions, if said conditions are made in a semantic description.

10. The automatic knowledge management system according to claim 1, further comprising; an automatic alert module to automatically generate an alert signal, when an information file that satisfies certain alert conditions is obtained as a result of said automatic search of said automatic search engine.

* * * * *